(12) United States Patent
Rahn et al.

(10) Patent No.: US 8,603,211 B2
(45) Date of Patent: Dec. 10, 2013

(54) MIXTURE FOR THE TREATMENT OF UREA-CONTAINING FERTILIZERS

(75) Inventors: Ralf-Thomas Rahn, Mannheim (DE); Gerd Buehler, Speyer (DE); Alexander Wissemeier, Speyer (DE); Wolfgang Weigelt, Dudenhofen (DE)

(73) Assignee: FERTIVA GmbH, Mannheim (DE)

( * ) Notice: Subject to any disclaimer, the term of this patent is extended or adjusted under 35 U.S.C. 154(b) by 375 days.

(21) Appl. No.: 12/809,847

(22) PCT Filed: Dec. 18, 2008

(86) PCT No.: PCT/DE2008/002091
§ 371 (c)(1), (2), (4) Date: Feb. 22, 2011

(87) PCT Pub. No.: WO2009/079994
PCT Pub. Date: Jul. 2, 2009

(65) Prior Publication Data
US 2011/0154874 A1    Jun. 30, 2011

(30) Foreign Application Priority Data

Dec. 22, 2007   (DE) .......................... 10 2007 062 614

(51) Int. Cl.
*C05C 9/00*       (2006.01)
*C05F 11/00*      (2006.01)
*C09K 3/00*       (2006.01)

(52) U.S. Cl.
USPC ........... 71/11; 71/28; 71/29; 71/30; 71/64.07; 252/182.3

(58) Field of Classification Search
USPC .................... 252/182.3; 71/11, 28–30, 64.07
See application file for complete search history.

(56) References Cited

U.S. PATENT DOCUMENTS

| | | | | |
|---|---|---|---|---|
| 4,517,004 A | * | 5/1985 | Swerdloff et al. | 71/28 |
| 4,517,007 A | * | 5/1985 | Swerdloff et al. | 71/28 |
| 4,518,413 A | * | 5/1985 | Swerdloff et al. | 71/28 |
| 4,530,714 A | * | 7/1985 | Kolc et al. | 71/28 |
| 4,537,614 A | * | 8/1985 | Van Der Puy et al. | 71/28 |
| 4,539,037 A | * | 9/1985 | Swerdloff et al. | 71/28 |
| 5,352,265 A | | 10/1994 | Weston et al. | |
| 5,364,438 A | | 11/1994 | Weston et al. | |
| 8,048,189 B2 | * | 11/2011 | Whitehurst et al. | 71/11 |
| 8,075,659 B2 | * | 12/2011 | Wissemeier et al. | 71/29 |
| 8,377,849 B2 | * | 2/2013 | Wilson et al. | 504/101 |
| 2004/0031303 A1 | | 2/2004 | Whitehurst et al. | |
| 2008/0070871 A1 | * | 3/2008 | Hucke et al. | 514/138 |
| 2011/0259068 A1 | * | 10/2011 | Whitehurst et al. | 71/29 |

FOREIGN PATENT DOCUMENTS

| | | |
|---|---|---|
| EP | 1 820 788 A1 | 8/2007 |
| WO | WO 00/61522 | 10/2000 |

OTHER PUBLICATIONS

K. Bharati, et al., "Influence of six nitrification inhibitors on methane production in a flooded alluvial soil", Nutrient Cycling in Agroecosystems, Bd. 58, Nr. 1-3, XP-002544171, Nov. 2000, pp. 389-394.

* cited by examiner

*Primary Examiner* — Wayne Langel
(74) *Attorney, Agent, or Firm* — Oblon, Spivak, McClelland, Maier & Neustadt, L.L.P.

(57) ABSTRACT

A mixture for the treatment of urea-containing fertilizers comprises a) at least one (thio)phosphoric acid triamide of the general formula (I) $R^1R^2N—P(X)(NH_2)_2$ and/or (thio)phosphoric acid diamide of the general formula (II) $R^1O—P(X)(NH_2)_2$, X denoting oxygen or sulfur, $R^1$ and $R^2$ independently from each other being hydrogen, substituted or unsubstituted 2-nitrophenyl, $C_{1-10}$-alkyl, $C_{3-10}$-cycloalkyl, $C_{3-10}$-heterocycloalkyl, $C_{6-10}$-aryl, $C_{6-10}$-heteroaryl or diaminocarbonyl, where $R^1$ and $R^2$ together with the nitrogen atom connecting them can also form a 5 or 6-membered saturated or unsaturated heterocyclic group, which optionally may also comprise one or two additional heteroatoms selected from the group consisting of nitrogen, oxygen, and sulfur, as component A, and b) at least one compound comprising an amino group having a boiling point of more than 100° C. as component B.

18 Claims, No Drawings

MIXTURE FOR THE TREATMENT OF UREA-CONTAINING FERTILIZERS

The invention relates to a mixture for the treatment of urea-containing fertilizers, more particularly having an improved urease-inhibitory effect, to the use thereof, and to urea-containing fertilizers comprising said mixture.

Worldwide, the predominant and further-increasing amount of the nitrogen used for fertilizing is employed in the form of urea or urea-containing fertilizers. Urea itself, however, is a form of nitrogen which is absorbed very little if at all, being hydrolyzed relatively rapidly by the enzyme urease, which is present ubiquitously in the soil, to form ammonia and carbon dioxide (Mobley, H. L. T., Island, M. D. Hausinger, R. P. (1995) Molecular biology of microbial ureases, Microbiol. Rev. 59, 452-480). In this process, in certain circumstances, gaseous ammonia is emitted to the atmosphere, and is then no longer available in the soil for the plants, thereby lowering the efficiency of fertilization.

It is known that the degree of utilization of the nitrogen when using urea-containing fertilizers can be improved by spreading urea-containing fertilizers together with substances which are able to inhibit or decrease the enzymatic cleavage of urea (for a general review, see Kiss, S. Simihäian, M. (2002) Improving Efficiency of Urea Fertilizers by Inhibition of Soil Urease Activity, ISBN 1-4020-0493-1, Kluwer Academic Publishers, Dordrecht, The Netherlands). Among the most potent known urease inhibitors are N-alkylthiophosphoric acid triamides and N-alkylphosphoric acid triamides, which are described in EP 0 119 487, for example.

Additionally, mixtures of N-alkylthiophosphoric acid triamides such as N-(n-butyl)thiophosphoric acid triamide (NBPT) and N-(n-propyl)thiophosphoric acid triamide (NPPT) can be used.

These urease inhibitors are described in U.S. Pat. No. 4,530,714, for example. In order for this class of compound to be able to act as a urease inhibitor, there must first be a conversion to the corresponding oxo form. That form reacts subsequently with the urease, causing its inhibition.

It is advisable to apply the urease inhibitors together with the urea onto or into the soil, since this ensures that the inhibitor comes into contact, together with the fertilizer, with the soil. The active compound may be incorporated in the urea by, for example, dissolving it into the melt prior to urea granulation or prilling. A process of this kind is described in U.S. Pat. No. 5,352,265, for example. A further option is to apply the active compound to the urea granules or prills, in the form of a solution, for example.

Corresponding processes for application, and suitable solvents, are described in EP-A-1 820 788, for example.

The storage life of the active compound is limited. The higher the temperature, the shorter the storage life. If, for example, urea is stored under tropical conditions, more than 60% of the active compound has undergone decomposition, generally, after about four weeks of storage. If the active compound is introduced into the urea melt, the decomposition is less. For the commercialization of the urea stabilized with the active compound, however, it is often vital to apply the active compound to urea and to store the treated fertilizer until the time of its spreading to the soil.

It is an object of the present invention to provide a mixture for the treatment of urea-containing fertilizers, more particularly for urease inhibition, which, following application to urea-containing fertilizers, has a relatively long storage life, is more robust as it passes through various distribution stages, and protects the active compound applied to urea from decomposition or loss. The mixture is to be toxicologically unobjectionable and is not to adversely affect the activity of the active compound.

This object is achieved in accordance with the invention by means of a mixture for the treatment of urea-containing fertilizers, comprising a) at least one (thio)phosphoric acid triamide of the general formula (I) and/or (thio)phosphoric acid diamide of the general formula (II)

$$R^1R^2N\text{---}P(X)(NH_2)_2 \quad (I)$$

$$R^1O\text{---}P(X)(NH_2)_2 \quad (II)$$

with the following definitions:
X is oxygen or sulfur,
$R^1$ and $R^2$ independently of one another are hydrogen, in each case substituted or unsubstituted $C_{1-10}$ alkyl, $C_{3-10}$ cycloalkyl, $C_{3-10}$ heterocycloalkyl, $C_{6-10}$ aryl, $C_{6-10}$ heteroaryl or diaminocarbonyl, it also being possible for $R^1$ and $R^2$, together with the nitrogen atom joining them, to form a 5- or 6-membered saturated or unsaturated heterocyclic moiety, which optionally may also contain one or two further heteroatoms selected from the group consisting of nitrogen, oxygen and sulfur, as component A, b) at least one compound containing an amino group, for example at least one amine, as component B, having a boiling point of more than 100° C.

The invention provides, moreover, for the use of the mixture as an additive and coating material for urea-containing nitrogen fertilizers.

The invention further provides for the use of the mixture for reducing the nitrogen losses in organic fertilizers or during the storage of liquid manure and for lowering the ammonia load in animal stables.

The invention further provides a urea-containing fertilizer comprising the mixture according to the invention in an amount such that the total amount of component A, based on the urea present, is 0.001% to 0.5% by weight.

Component B comprises at least one amino group, e.g., primary, secondary or tertiary amino group, it being possible for any desired further functional groups and moieties, such as hydroxyl, halogen, carboxyl, carbamoyl, carbonyl, oxyalkyl, mercapto, M-sulfido, sulfoxy, sulfo, phosphor, siloxy, amino, amido, imino, imido, oxyamido groups, etc., to be present in the compound. Component B is elucidated in more detail below, as an amine by way of example. The statements also apply generally to component B.

It has been found in accordance with the invention that the active compound applied to urea, of component A, has a significantly higher storage life (at least 2-3 months) when used in combination with at least one amine having a boiling point of more than 100° C. as component B. This amine of component B preferably has a boiling point of more than 150° C., more preferably of more than 200° C. at ambient pressure (1 bar). The amines in question may be primary, secondary or tertiary amines or polyamines which carry two or more of these amino groups. As amines it is preferred to use secondary and/or tertiary amines. Particular preference is given to using tertiary amines, which may also be present in polymeric form. It is preferred to use those amines which do not enter into any chemical reaction with the active compound of component A or with a solvent of component C, which is optionally used as well. By way of example, the amines of component B are selected from methyldiethanolamine, tetrahydroxypropylethylenediamine, trimethylaminoethylethanolamine, N,N,N',N'-tetramethyl-1,6-hexanediamine, N,N',N"-tris(dimethylaminopropyl)hexahydrotriazine, 2,2'-dimorpholinyldiethyl ether or mixtures thereof.

Component B is used in an amount which is sufficient to increase the storage life of the active compound of component A on urea-containing fertilizers. Component B ought preferably to be used in at least 0.2 times the molar amount of component A, more preferably in 0.5 to 3 times the molar amount, more particularly in 1 to 2 times the molar amount.

Amines having a high boiling point are advantageous in the application for reasons as well of odor and of protection against explosion.

Very surprisingly, amides, such as N-methylpyrrolidone (NMP), for example, show no stabilizing action.

This stabilizing effect is independent of the accompanying use of a solvent. The addition of amine displays a stabilizing effect both when NMP is used and when alkylenediols such as 1,2-propanediol are used as solvents.

Through addition of polymeric auxiliaries it is possible, furthermore, to increase the stabilizing action still further.

Used as component A is at least one (thio)phosphoric acid triamide of the general formula (I) and/or (thio)phosphoric acid diamide of the general formula (II). These may be individual compounds or else mixtures of two or more such compounds. For example, they may be mixtures of the kind described in EP-A-1 820 788.

The moieties $R^1$ and $R^2$ may each be unsubstituted or substituted, by halogen and/or nitro, for example.

Examples of alkyl groups are methyl, ethyl, propyl, isopropyl, n-butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl and isodecyl. Cycloalkyl groups are, for example, cyclopropyl, cyclobutyl, cyclopentyl, cyclohexyl and cyclooctyl; aryl groups are, for example, phenyl or naphthyl, or, in substituted form, 2-nitrophenyl. Examples of heterocyclic moieties $R^1R^2N-$ are piperazinyl, morpholinyl, pyrrolyl, pyrazolyl, triazolyl, oxazolyl, thiazolyl or imidazolyl groups.

Compounds of this kind are known as urease inhibitors from EP 0 119 487, WO 00/58317 and EP 1 183 220, for example.

One example of compounds of the formula (II) is phenyl phosphorodiamidate.

Preferred preparations are those comprising N-n-butylthiophosphoric acid triamide (NBPT) as one of the active compounds. The at least one further active compound is preferably a derivative selected from the group consisting of N-cyclohexyl-, N-pentyl-, N-isobutyl- and N-propylphosphoric acid triamide and corresponding thiophosphoric acid triamides. Particularly preferred preparations are those containing NBPT in amounts of 40% to 95% by weight, very preferably of 60% to 80% by weight, based in each case on the total amount of active compound in component A.

Thiophosphoric acid triamides are known to be relatively easily hydrolyzed to the corresponding phosphoric acid triamides. Since, generally speaking, moisture cannot be entirely excluded, thiophosphoric acid triamide and the corresponding phosphoric acid triamide are frequently present in a mixture with one another. In this specification, therefore, the term "(thio)phosphoric acid triamide" identifies not only the pure thiophosphoric acid triamides and phosphoric acid triamides but also mixtures thereof.

Particular preference is given to N-alkylthiophosphoric acid triamides (with X=S and $R^2$=H) and N-alkylphosphoric acid triamides (with X=O and $R^2$=H).

Urease inhibitors of this kind can be prepared, for example, by known methods from thiophosphoryl chloride, primary or secondary amines, and ammonia, as described in U.S. Pat. No. 5,770,771, for example. In such a reaction, in a first step, thiophosphoryl chloride is reacted with one equivalent of a primary or secondary amine, in the presence of a base, and the product is then reacted with an excess of ammonia to give the end product.

Other suitable urease inhibitors are described in WO 00/61522, WO 00/58317, WO 02/083697, WO 01/87898, WO 2006/010389, for example. The compounds described therein are, for example, thiophosphoric acid triamides, heterocyclically substituted (thio)phosphoric acid triamides, N-(2-pyrimidinyl)(thio)phosphoric acid triamides and N-phenylphosphoric acid triamides.

EP-A-1 820 788 describes more particularly mixtures of N-(n-butyl)thiophosphoric acid triamide and N(n-propyl) thiophosphoric acid triamide. These mixtures can be used in accordance with the invention, in addition to the individual substances, with particular preference.

The (thio)phosphoric acid triamides of the general formula (I), and/or (thio)phosphoric acid diamides of the general formula (II), which are employed as component A, may be pure substances or may be mixtures of two or more pure substances. They may also still contain byproducts from the active compound synthesis process. Generally speaking, the purity of component A is at least 70%.

The mixtures according to the invention may comprise only components A and B. In that case, for example, component B may possibly serve as a solvent for component A, resulting in a liquid or easily meltable composition. It is also possible in accordance with the invention to use solid mixtures of components A and B, and also mixtures in emulsion or dispersion form.

According to one embodiment of the invention, the mixture may further comprise a solvent for the (thio)phosphoric acid triamides, as component C. In that case it is possible to use all suitable solvents. Solvents contemplated are generally those compounds which are polar and hence have sufficient solvency for component A. They ought preferably to have a sufficiently high boiling point, and so, on application, the evaporation of sizable quantities of solvents is unlikely. Examples of suitable solvents are alcohols, amines, carboxylic acid derivatives such as esters, amides, urea derivatives, halogenated compounds, substituted aromatics, and mixtures thereof. Suitable solvents are described in EP-A-1 820 788, for example. Suitable solvents may be water, alcohols, glycols and also NMP or dimethyl phthalate. Examples of suitable liquid formulations are found in WO 07/22568. Described therein are solvents based on glycols or glycol derivatives. Examples of suitable glycols are propylene glycol and dipropylene glycol. The glycols may be described generally as terminal $C_{2-10}$ alkylenediols. Examples of other glycols are neopentyl glycol, pinacol, 2,2-diethyl-1,3-propanediol, 2-ethyl-1,3-hexanediol, 2-ethyl-2-butyl-1,3-propanediol, isobutene glycol, 2,3-dimethyl-1,3-propanediol, 1,3-diphenyl-1,3-propanediol, 3-methyl-1,3-butanediol. Examples of cyclic glycols are 1,4-cyclohexanedimethanol and p-xylylene glycol. Examples of polyglycols are polyethylene glycol and polypropylene glycols. Suitable derivatives may be esters such as stearates or caprylates. Use may also be made, for example, of glycerol or glyceryl esters. Other suitable additional solvents may be liquid amides, 2-pyrrolidone and N-alkyl-2-pyrrolidones such as NMP.

A particularly preferred solvent used is dimethyl phthalate.

As an alternative it is also possible to use solid formulations, which as well as the mixture may comprise adjuvants such as fillers, binders or granulating assistants such as lime, gypsum, silicon dioxide or kaolinite. Mixtures according to the invention may at the same time, in addition to components A and B, also comprise solvents or solvent mixtures and adjuvants, and may take the form of a suspension.

In accordance with the invention there may be a further component D present in the mixtures, comprising polymers in dissolved or dispersed form. Preferred polymers in that case are those which do not enter into any chemical reactions with components A and B. The polymers may be in solution, in emulsion or in dispersed form. It is preferred to use soluble polymers, which preferably have a number-average molecular weight of at least 5000. Suitable polymers may originate from vinylic monomers, as for example from styrenes or (meth)acrylates or acrylonitrile. It is possible, by way of example, to use soluble polystyrenes, soluble polystyrene-acrylonitrile polymers, or else polymers of this kind comprising graft rubbers. Polyesters or polyalkylene glycols, for example, may additionally be used. The stabilization of the urease inhibitors of component A is further improved by the addition of the polymers. They may also be used for delayed, controlled release of the mixture. The constituents are present in the mixture preferably in amounts as given below.

The fraction of the urease inhibitor of component A is preferably 5% to 90% by weight, more preferably 10% to 40% by weight, more particularly 15% to 30% by weight. The fraction of the amine of component B is preferably 1% to 50% by weight, more preferably 2% to 25% by weight, more particularly 3% to 15% by weight. Where a solvent is used as well, as component C, the fraction of the solvent as a proportion of the mixture is preferably 10% to 94% by weight, more preferably 20% to 88% by weight, more particularly 30% to 82% by weight. The amount of optional polymer component D is preferably 0% to 70% by weight, more preferably 0% to 50% by weight, more particularly 0% to 25% by weight. When component D is present, the amount is preferably 0.5% to 70% by weight, more preferably 1% to 50% by weight, more particularly 2% to 25% by weight. The total amount of components A, B, C and, where used, D adds up to 100% by weight.

The mixtures according to the invention can be prepared by simple mixing of components A, B and, where used, C and D. This mixing may also be carried out at an elevated temperature of 30 to 60° C., for example. The sequence in which the individual components are added in this procedure is arbitrary. Where a solvent is used as well, typically, first components A and B are dissolved in the solvent, and then the polymer of component D is introduced. Where it is necessary to heat the mixtures in the course of the preparation process, it is preferred to add component A last.

The mixtures according to the invention are used as an additive or coating material for urea-containing nitrogen fertilizers.

As an additive they may be spread before, after or together with a urea-containing nitrogen fertilizer. The mixture according to the invention may in that case be metered separately from the urea-containing nitrogen fertilizer. More frequently, the mixture according to the invention is incorporated into the urea-containing nitrogen fertilizer, in a melt, for example, or is applied as a coating material to the urea-containing nitrogen fertilizer. Where they are used accompanyingly as an additive for urea-containing nitrogen fertilizers, the mixtures according to the invention are employed preferably in an amount of 0.1% to 30% by weight, based on the weight of the nitrogen fertilizer.

In parallel with the improvement of the utilization of nitrogen in the urea-containing, mineral and organic fertilizers, the use of these compositions has the effect that there is an increase—in some cases considerably—in the yields or production of biomass of crop plants.

Equally, the mixtures according to the invention may be added to organic fertilizers, such as liquid manure, for example, during the actual storage of such fertilizers, in order thus to prevent nitrogen nutrient losses, by virtue of decelerated conversion of the individual forms of nitrogen into gaseous nitrogen compounds, which are therefore volatile, and in order as a result, at the same time, to contribute to a lowering of the ammonia load in animal stables.

The mixtures according to the invention exhibit an unexpectedly high biological activity. Particularly noteworthy, accordingly, are the extremely high yield increase rates.

In this context it is immaterial whether the compositions of the invention are incorporated, by melting, for example, into the fertilizer, or else are applied to the fertilizer surface or applied separately from the spreading of the fertilizer, in the form, for example, of a (suspension) concentrate, a solution or a formulation.

It is particularly preferred in accordance with the invention to use the mixtures according to the invention as coating materials for urea-containing nitrogen fertilizers.

The invention also provides a urea-containing fertilizer comprising a mixture as described above in an amount such that the total amount of component A, based on the urea present, is 0.001% to 0.5% by weight. The amount of component A, based on the urea present is more preferably 0.01% to 0.3% by weight, more particularly 0.02% to 0.2% by weight. In the urea-containing fertilizer, the mixture is preferably applied to the surface of the urea-containing fertilizer.

By a urea-containing fertilizer is meant, first of all, urea itself. In customary commercial fertilizer quality, this urea has a purity of at least 90%, and may for example be in crystalline, granulated, compacted, prilled or ground form. In addition, the term is also intended to encompass mixtures of urea with one or more further nitrogen fertilizers such as ammonium sulfate, ammonium nitrate, ammonium chloride, cyanamide, dicyandiamide (DCD) or calcium nitrate, and also slow-release fertilizers, examples being urea-formaldehyde, urea-acetaldehyde or urea-glyoxal condensates. Also included, furthermore, are urea-containing multinutrient fertilizers which as well as nitrogen also comprise at least one further nutrient such as phosphorus, potassium, magnesium, calcium or sulfur. Also present as well may be the trace elements boron, iron, copper, zinc, manganese or molybdenum. Urea-containing multinutrient fertilizers of this kind may likewise be in granulated, compacted, prilled or ground form or in the form of a crystal mixture. Also encompassed, furthermore, are liquid, urea-containing fertilizers, such as ammonium nitrate-urea solution or else liquid manure. The urea-containing fertilizers may further comprise one or more other active compounds such as, for example, nitrification inhibitors, herbicides, fungicides, insecticides, growth regulators, hormones, pheromones or other plant protection agents or soil adjuvants in amounts from 0.01% to 20% by weight.

The fertilizers of the invention are obtainable by either mixing the mixtures according to the invention, in either liquid or solid form, with the urea-containing fertilizer, or incorporating them into it by granulation, compacting or prilling, by addition to a corresponding fertilizer mixture or to a mash or melt. With particular preference the mixtures according to the invention are applied to the surface of existing granules, compacts or prills of the urea-containing fertilizers, by means of spraying, powder application or impregnating, for example. This can also be done using further auxiliaries such as adhesive promoters or encasing materials. Examples of apparatuses suitable for performing such application include plates, drums, mixers or fluidized-bed apparatus, although application may also take place on conveyor belts or their discharge points or by means of pneumatic conveyors for solids. A concluding treatment with anticaking agents and/or antidust agents is likewise possible. The fertilizers or mixtures of the invention are used in the context of fertilization with urea-containing fertilizers. Application takes place preferably to an agriculturally or horticulturally exploited plot.

The invention is illustrated by the examples which follow.

EXAMPLES

In the examples below, the following abbreviations have the following meanings:
NBPT N-(n-butyl)thiophosphoric acid triamide
NPPT N-(n-propyl)thiophosphoric acid triamide
NMP N-methylpyrrolidone
MDEA methyldiethanolamine
CAN calcium ammonium nitrate Examples 1 and 2 relate to the storage life of the active compound on the inventively treated fertilizers, and example 3 relates to the plant compatibility of the mixtures according to the invention.

Example 1

In a storage test over 60 days at 30° C. and an atmospheric humidity of 60%, the NBPT losses measured (HPLC analysis) were as indicated below. At the beginning of the storage test, the NBPT was applied in a concentration of 0.12% by weight, based on the fertilizer, in a solution having the composition indicated below. The carrier fertilizer used was granulated urea.

| Composition of the formulation | NBPT loss after 60 days |
|---|---|
| 25% NBPT, dimethyl phthalate | 95% |
| 25% NBPT, 18% methyldiethanolamine, dimethyl phthalate | 68% |
| 25% NBPT, 5% polystyrene (Luran 368 R), dimethyl phthalate | 95% |
| 25% NBPT, 18% methyldiethanolamine, 5% polystyrene (Luran 368 R), dimethyl phthalate | 59% |
| 25% NBPT, 5% polyethylene glycol, dimethyl phthalate | 95% |
| 25% NBPT, 18% methyldiethanolamine, 5% polyethylene glycol, dimethyl phthalate | 42% |
| Comparative: 25% NBPT as solution in dimethyl phthalate, introduced into urea melt and left to solidify on pelletizing belt | 40% |

Example 2

In a further storage test over 30 days at 30° C. and an atmospheric humidity of 60%, the NBPT losses measured (HPLC analysis) were as indicated below. At the beginning of the storage test, the NBPT was applied in a concentration of 0.12% by weight, based on the fertilizer, in a solution having the composition indicated below. The carrier fertilizer used was granulated urea.

| Composition of the formulation | NBPT loss after 30 days |
|---|---|
| 25% NBPT, dimethyl phthalate | 54% |
| 25% NBPT, 6% methyldiethanolamine, dimethyl phthalate, | 9% |
| 25% NBPT, 12% methyldiethanolamine, dimethyl phthalate | 7% |
| 25% NBPT, 18% methyldiethanolamine, dimethyl phthalate | 9% |
| 25% NBPT, 36% methyldiethanolamine, dimethyl phthalate | 14% |
| 25% NBPT, N-methylpyrrolidone | 36% |
| 25% NBPT, 18% N,N,N',N'-tetramethyl-1,6-hexanediamine, dimethyl phthalate | 5% |
| 25% NBPT, 18% trimethylaminoethylethanolamine, dimethyl phthalate | 7% |
| 25% NBPT, 18% N,N',N''-tris(dimethylaminopropyl)hexahydrotriazine, dimethyl phthalate | 7% |
| Comparative: 25% NBPT as solution in dimethyl phthalate, introduced into urea melt and left to solidify on pelletizing belt | 8% |

Example 3

Planting experiments carried out under glass in size 12 plastic pots showed the plant compatibility of methyldiethanolamine, dimethyl phthalate to urea or, as a comparison, calcium ammonium nitrate. The soil used was Limburgerhof soil (slightly loamy sand, pH 6.8) with Chinese cabbage as the test crop. The properties of the soil, as determined by the CAL method, were as follows:

| | |
|---|---|
| $P_2O_5$ | 35 mg/100 g soil |
| $K_2O$ | 18 mg/100 g soil |
| Mg | 5 mg/100 g soil |

| | | | |
|---|---|---|---|
| Slurriable components: | Clay | <2 μm | 7% |
| | | <20 μm | 17% |
| | Sand | | 76% |
| Total nitrogen: | | | 0.08% |
| Humus: | | | 1.2% |

The fertilizers were mixed into the soil a day before planting. Similar results were obtained when the fertilizer was broadcast onto the soil (not shown). In both cases, the pots were watered from above with mains water in accordance with gardening practice.

| Fertilizer (mixed into soil) | Fertilization level (g N/pot) | % plant damage 5 days after planting | Fresh mass of shoots 21 days after planting (g/pot) |
|---|---|---|---|
| Urea | 0.05 | 0 | 14.3 |
| Urea | 0.1 | 0 | 20.05 |
| Urea | 0.2 | 7.5 | 11.65 |
| Urea + 0.04% NBPT | 0.05 | 0 | 16.9 |
| Urea + 0.04% NBPT | 0.1 | 7.5 | 22.4 |
| Urea + 0.04% NBPT | 0.2 | 8.0 | 7.6 |
| Urea + 0.12 NBPT + 0.12% MDEA* | 0.05 | 0 | 16.0 |
| Urea + 0.12 NBPT + 0.12% MDEA* | 0.1 | 5 | 22.7 |
| Urea + 0.12 NBPT + 0.12% MDEA* | 0.2 | 7.5 | 9.9 |
| Calcium ammonium nitrate (CAN) | 0.05 | 0 | 17.9 |
| Calcium ammonium nitrate (CAN) | 0.1 | 0 | 26.7 |

-continued

| Fertilizer (mixed into soil) | Fertilization level (g N/pot) | % plant damage 5 days after planting | Fresh mass of shoots 21 days after planting (g/pot) |
|---|---|---|---|
| Calcium ammonium nitrate (CAN) | 0.2 | 0 | 23.6 |
| Calcium ammonium nitrate (CAN) | 0.4 | 0 | 7.4 |
| CAN + 0.07% MDEA* | 0.1 | 0 | 25.8 |
| CAN + 0.14% MDEA* | 0.1 | 0 | 26.7 |
| CAN + 0.28% MDEA* | 0.1 | 0 | 24.0 |
| CAN + 0.56% MDEA* | 0.1 | 0 | 27.4 |
| CAN + 1.4% MDEA* | 0.1 | 0 | 25.2 |
| CAN + 0.035% MDEA* | 0.2 | 0 | 25.9 |
| CAN + 0.07% MDEA* | 0.2 | 0 | 27.4 |
| CAN + 0.14% MDEA* | 0.2 | 0 | 20.7 |
| CAN + 0.28% MDEA* | 0.2 | 0 | 25.3 |

*MDEA = methyldiethanolamine

The invention claimed is:

1. A mixture for the treatment of urea-containing fertilizers, comprising
a) at least one (thio)phosphoric acid triamide of the general formula (I) and/or (thio)phosphoric acid diamide of the general formula (II)

$$R^1R^2N\text{---}P(X)(NH_2)_2 \quad (I)$$

$$R^1O\text{---}P(X)(NH_2)_2 \quad (II)$$

with the following definitions:
X is oxygen or sulfur,
$R^1$ and $R^2$ independently of one another are hydrogen, in each case substituted or unsubstituted 2-nitrophenyl, $C_{1-10}$ alkyl, $C_{3-10}$ cycloalkyl, $C_{3-10}$ heterocycloalkyl, $C_{6-10}$ aryl, $C_{6-10}$ heteroaryl or diaminocarbonyl, it also being possible for $R^1$ and $R^2$, together with the nitrogen atom joining them, to form a 5- or 6-membered saturated or unsaturated heterocyclic moiety, which optionally may also contain one or two further heteroatoms selected from the group consisting of nitrogen, oxygen and sulfur, as component A,
b) at least one compound containing an amino group or a substituted amino group, as component B, having a boiling point of more than 100° C., wherein component (B) is at least one selected from the group consisting of methyldiethanolamine, tetrahydroxypropylethylenediamine, trimethylaminoethylethanolamine, N,N,N',N'-tetramethyl-1,6-hexanediamine, N,N',N''-tris(dimethylaminopropyl)hexahydrotriazine, 2,2'-dimorpholinyldiethyl ether and mixtures thereof.

2. The mixture as claimed in claim 1, comprising at least one selected from the group consisting of an N-alkylthiophosphoric acid triamide wherein X=S and $R^2$=H and an N-alkylphosphoric acid wherein X=O and $R^2$=H.

3. The mixture as claimed in claim 1, further comprising a solvent for the (thio)phosphoric acid triamides, as component C.

4. The mixture as claimed in claim 1, further comprising a polymer in dissolved or dispersed form as component D.

5. An additive or coating material for urea-containing nitrogen fertilizers comprising the mixture of claim 1.

6. The additive or coating material of claim 5 wherein the mixture is spread in the form of a formulation, solution or dispersion separately or simultaneously with the fertilizer or is incorporated into the fertilizer or is applied to the fertilizer.

7. A urea-containing fertilizer comprising a mixture as claimed in claim 1, wherein the total amount of component A, based on the urea present, is 0.001% to 0.5% by weight.

8. The urea-containing fertilizer as claimed in claim 7, wherein the mixture is applied to the surface of the urea-containing fertilizer.

9. The mixture of claim 1, wherein component (B) has a boiling point of more than 150° C.

10. The mixture of claim 1, wherein component (B) has a boiling point of more than 200° C.

11. The mixture of claim 1, wherein component (B) is a tertiary amine in polymeric form.

12. The mixture of claim 1, wherein component (B) is present in the mixture in an amount of 0.5 to 3 times the molar amount of component (a).

13. The mixture of claim 1, comprising an N-n-butylthiophosphoric acid triamide in an amount of 40-95% by weight of component A.

14. A urea-containing fertilizer comprising the mixture of claim 1 in an amount of 0.1 to 30% by weight based on the total weight of the fertilizer.

15. A urea-based fertilizer in granulate form, comprising:
the mixture of claim 1,
wherein the mixture is present as a coating on the surface of the urea-based fertilizer and comprises at least one N-n-butylthiophosphoric acid triamide and methyldiethanolamine.

16. An organic fertilizer comprising the mixture of claim 1 in an amount effective for reducing nitrogen losses during storage of the organic fertilizer in liquid form and/or for lowering the ammonia load in an animal stable.

17. The mixture of claim 1, wherein the component (B) is a non-salt compound.

18. A mixture for the treatment of urea-containing fertilizers, comprising
a) at least one (thio)phosphoric acid triamide of the general formula (I) and/or (thio)phosphoric acid diamide of the general formula (II)

$$R^1R^2N\text{---}P(X)(NH_2)_2 \quad (I)$$

$$R^1O\text{---}P(X)(NH_2)_2 \quad (II)$$

with the following definitions:
X is oxygen or sulfur,
$R^1$ and $R^2$ independently of one another are hydrogen, in each case substituted or unsubstituted 2-nitrophenyl, $C_{1-10}$ alkyl, $C_{3-10}$ cycloalkyl, $C_{3-10}$ heterocycloalkyl, $C_{6-10}$ aryl, $C_{6-10}$ heteroaryl or diaminocarbonyl, it also being possible for $R^1$ and $R^2$, together with the nitrogen atom joining them, to form a 5- or 6-membered saturated or unsaturated heterocyclic moiety, which optionally may also contain one or two further heteroatoms selected from the group consisting of nitrogen, oxygen and sulfur, as component A,
b) at least one compound containing a substituted amino group, as component B, having a boiling point of more than 100° C., wherein component (B) comprises at least one secondary or tertiary amine.

* * * * *